United States Patent
Hashiguchi et al.

(10) Patent No.: US 10,204,106 B2
(45) Date of Patent: Feb. 12, 2019

(54) MANAGEMENT METHOD, MANAGEMENT DEVICE, AND MANAGEMENT SYSTEM

(71) Applicants: FUJITSU LIMITED, Kawasaki-shi, Kanagawa (JP); HONDA MOTOR CO., LTD., Tokyo (JP)

(72) Inventors: Naoki Hashiguchi, Yokohama (JP); Kou Kawanobe, Saitama (JP); Hiroshi Ishida, Wako (JP)

(73) Assignees: FUJITSU LIMITED, Kawasaki (JP); HONDA MOTOR CO., LTD., Tokyo (JP)

( * ) Notice: Subject to any disclaimer, the term of this patent is extended or adjusted under 35 U.S.C. 154(b) by 394 days.

(21) Appl. No.: 14/595,386

(22) Filed: Jan. 13, 2015

(65) Prior Publication Data

US 2015/0227532 A1     Aug. 13, 2015

(30) Foreign Application Priority Data

Feb. 7, 2014    (JP) .................................. 2014-022731

(51) Int. Cl.
*G06F 17/30*     (2006.01)

(52) U.S. Cl.
CPC .. *G06F 17/30073* (2013.01); *G06F 17/30153* (2013.01)

(58) Field of Classification Search
CPC ......... G06F 17/30035; G06F 17/30053; G06F 17/30011; G06F 17/30424;
(Continued)

(56) References Cited

U.S. PATENT DOCUMENTS

| | | | |
|---|---|---|---|
| 5,819,295 A | 10/1998 | Nakagawa et al. | |
| 6,901,403 B1 * | 5/2005 | Bata | G06F 17/30572 |

(Continued)

FOREIGN PATENT DOCUMENTS

| | | |
|---|---|---|
| JP | 3-46059 | 2/1991 |
| JP | 8-292884 | 11/1996 |

(Continued)

OTHER PUBLICATIONS

Patent Abstracts of Japan, Publication No. 03-046059, published Feb. 27, 1991.
(Continued)

*Primary Examiner* — Evan Aspinwall
(74) *Attorney, Agent, or Firm* — Staas & Halsey LLP

(57) ABSTRACT

A computer stores a file in a folder. The computer executes a process including acquiring identification information of files included in a single archive file, when the folder stores the single archive file, the single archive file being generated by integrating the files and performing a compression process, or by integrating the files; outputting the acquired identification information of the files as candidates that may be associated with another folder, file, or an individual data object in another file, which is managed by the computer; and storing association information with respect to one of the files which is specified to be associated with another folder, file, or an individual data object included in another file, the association information being information for associating the one of the files with another folder, or file, or an individual data object included in another file, which is a target of association.

16 Claims, 16 Drawing Sheets

(58) Field of Classification Search
CPC ......... G06F 17/30525; G06F 17/30902; G06F 17/30112; G06F 17/30651; G06F 17/30958; G06F 17/30554; G06F 17/30941; G06F 17/30873; G06F 17/30483; G06F 17/30876; G06F 17/30073; G06F 17/30153
USPC .......................................................... 707/693
See application file for complete search history.

(56) References Cited

U.S. PATENT DOCUMENTS

| | | | | |
|---|---|---|---|---|
| 7,814,554 | B1* | 10/2010 | Ragner | G06F 21/52 713/165 |
| 2005/0102322 | A1* | 5/2005 | Bagley | G09B 7/00 |
| 2006/0161635 | A1* | 7/2006 | Lamkin | G06F 17/30041 709/217 |
| 2008/0046413 | A1* | 2/2008 | Tokie | G06F 17/30864 |
| 2009/0248737 | A1* | 10/2009 | Shukla | G06F 9/44 |
| 2010/0070448 | A1* | 3/2010 | Omoigui | H01L 27/1463 706/47 |
| 2013/0091170 | A1* | 4/2013 | Zhang | G06Q 10/06313 707/783 |
| 2013/0218899 | A1* | 8/2013 | Raghavan | G06F 17/30958 707/741 |
| 2013/0282710 | A1* | 10/2013 | Raghavan | G06F 17/30554 707/728 |
| 2014/0258236 | A1* | 9/2014 | Vijayan | G06F 11/1448 707/639 |

FOREIGN PATENT DOCUMENTS

| | | |
|---|---|---|
| JP | 9-128380 | 5/1997 |
| JP | 10-254745 | 9/1998 |
| JP | 2001-51983 | 2/2001 |
| JP | 2001-56775 | 2/2001 |
| JP | 2002-182908 | 6/2002 |

OTHER PUBLICATIONS

Patent Abstracts of Japan, Publication No. 08-292884, published Nov. 5, 1996.
Patent Abstracts of Japan, Publication No. 10-254745, published Sep. 25, 1998.
Patent Abstracts of Japan, Publication No. 2001-051983, published Feb. 23, 2001.
Patent Abstracts of Japan, Publication No. 2001-056775, published Feb. 27, 2001.
Patent Abstracts of Japan, Publication No. 2002-182908, published Jun. 28, 2002.
Chinese Office Action dated Oct. 31, 2017 in related Chinese Application No. 201510051314.
Japanese Office Action dated Sep. 5, 2017 in related Japanese Application No. 2014-022731.

* cited by examiner

FIG.7
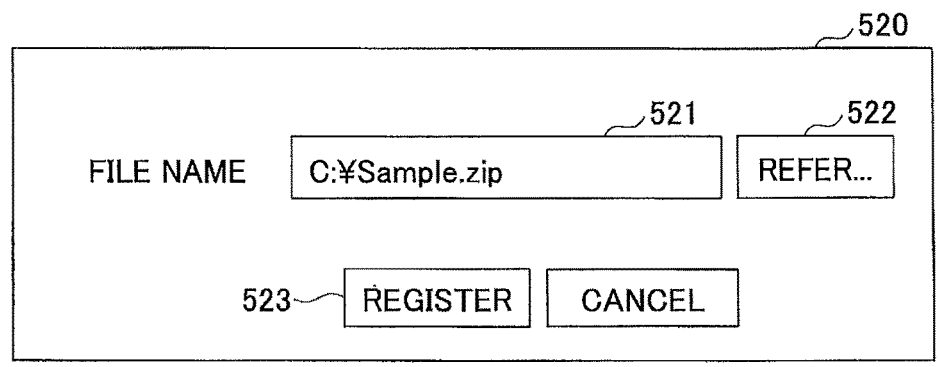
FIG.8
| ID | REVISION | FILE NAME |
|---|---|---|
| WPB0001 | 0001 | Sample.zip |
FIG.9
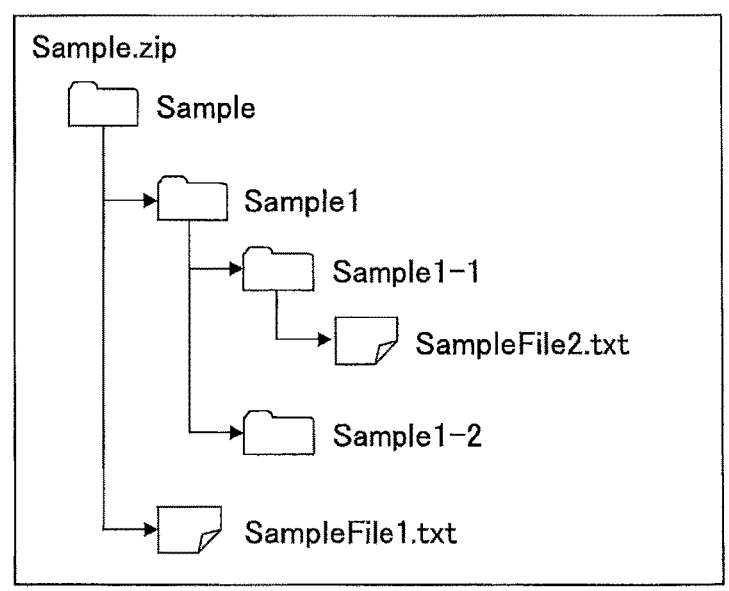

FIG.10

| ID | REVISION | ObjID | PARENT ObjID | NAME | TYPE |
|---|---|---|---|---|---|
| WPB0001 | 0001 | OB0001 | | Sample | FOLDER |
| WPB0001 | 0001 | OB0002 | OB0001 | Sample1 | FOLDER |
| WPB0001 | 0001 | OB0003 | OB0001 | SampleFile1.txt | FILE |
| WPB0001 | 0001 | OB0004 | OB0002 | Sample1-1 | FOLDER |
| WPB0001 | 0001 | OB0005 | OB0002 | Sample1-2 | FOLDER |
| WPB0001 | 0001 | OB0006 | OB0004 | SampleFile2.txt | FOLDER |

FIG.15

| SOURCE ID | DESTINATION ID | SOURCE REVISION | DESTINATION REVISION | SOURCE ObjID | DESTINATION ObjID |
|---|---|---|---|---|---|
| WPB0001 | WPB0002 | 0001 | 0001 | OB0006 | OB0010 |

| ID | REVISION | FILE NAME |
|---|---|---|
| WPB0001 | 0001 | Sample.zip |
| WPB0001 | 0002 | Sample.zip |

FIG.20

| SOURCE ID | DESTINATION ID | SOURCE REVISION | DESTINATION REVISION | SOURCE ObjID | DESTINATION ObjID |
|---|---|---|---|---|---|
| WPB0001 | WPB0002 | 0001 | 0001 | OB0006 | OB0010 |
| WPB0001 | WPB0002 | 0002 | 0001 | OB0014 | OB0010 |

MANAGEMENT METHOD, MANAGEMENT DEVICE, AND MANAGEMENT SYSTEM

CROSS-REFERENCE TO RELATED APPLICATION

This patent application is based upon and claims the benefit of priority of the prior Japanese Patent Application No. 2014-022731 filed on Feb. 7, 2014, the entire contents of which are incorporated herein by reference.

FIELD

The embodiments discussed herein are related to a management method, a management device, and a management system.

BACKGROUND

In a data management system for managing data of a deliverable such as a document created in a development process of respective components constituting a product, there is a system in which a folder that is the storage destination of the deliverable, may be defined in advance. For example, deliverables to be created in the respective stages of the development process are assumed, and the storage destinations of the deliverables are defined in advance by a system administrator.

The person in charge of development creates a deliverable corresponding to a storage destination defined in advance as the development process proceeds, and stores the deliverable in the storage destination. By repeating such an operation in the respective stages of the development process, it is possible to manage the deliverables, such that it is easily recognized that the deliverables needed for development are created without any omission.

Patent Document 1: Japanese Laid-Open Patent Publication No. 2001-56775

There are cases where the relationships between the storage destinations and the deliverables are set, in accordance with the connections between the respective stages of development operations and the connections between the components. By setting relationships between the storage destinations and the deliverables, the following advantage is obtained. That is, when a problem arises in a certain component such as a failure, the range of impact and the factor of the failure are easily recognized by tracing along the relationships set for the deliverable relevant to the component.

When a deliverable is constituted by a single file, the relationship set for the file corresponds to a single deliverable. However, when a plurality of deliverables are stored in a single archive file, the relationship relevant to the archive file is set for an assembly of the plurality of deliverables included in the archive file, even when the relationship is only relevant to some of the deliverables in the archive file. As a result, it may be difficult to analyze the relationships in units of deliverables.

SUMMARY

According to an aspect of the embodiments, a non-transitory computer-readable recording medium storing a file management program that causes a computer, which stores a file in a folder, to execute a process including acquiring identification information of a plurality of files included in a single archive file, when the folder stores the single archive file, the single archive file being generated by integrating the plurality of files and performing a compression process on the integrated plurality of files, or the single archive file being generated by integrating the plurality of files; outputting the acquired identification information of the plurality of files as candidates for each of which it is possible to be associated with another folder, or with another file, or with an individual data object included in another file, which is managed by the computer; and implementing control to cause a storage unit to store association information with respect to one of the plurality of files which is specified to be associated with another folder, or with another file, or with an individual data object included in another file, the association information being information for associating the one of the plurality of files with another folder, or another file, or an individual data object included in another file, which is a target of association.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 7 illustrates a display example of a file specification screen;

FIG. 8 illustrates an example of a record registered in the deliverable table;

FIG. 9 illustrates a configuration example of an archive file that is the registration target;

FIG. 10 illustrates examples of records registered in an object table;

FIG. 15 illustrates an example of a record registered in a connection table;

FIG. 20 illustrates an example of a record registered in the connection table by taking over the connection.

DESCRIPTION OF EMBODIMENTS

Figure 1:
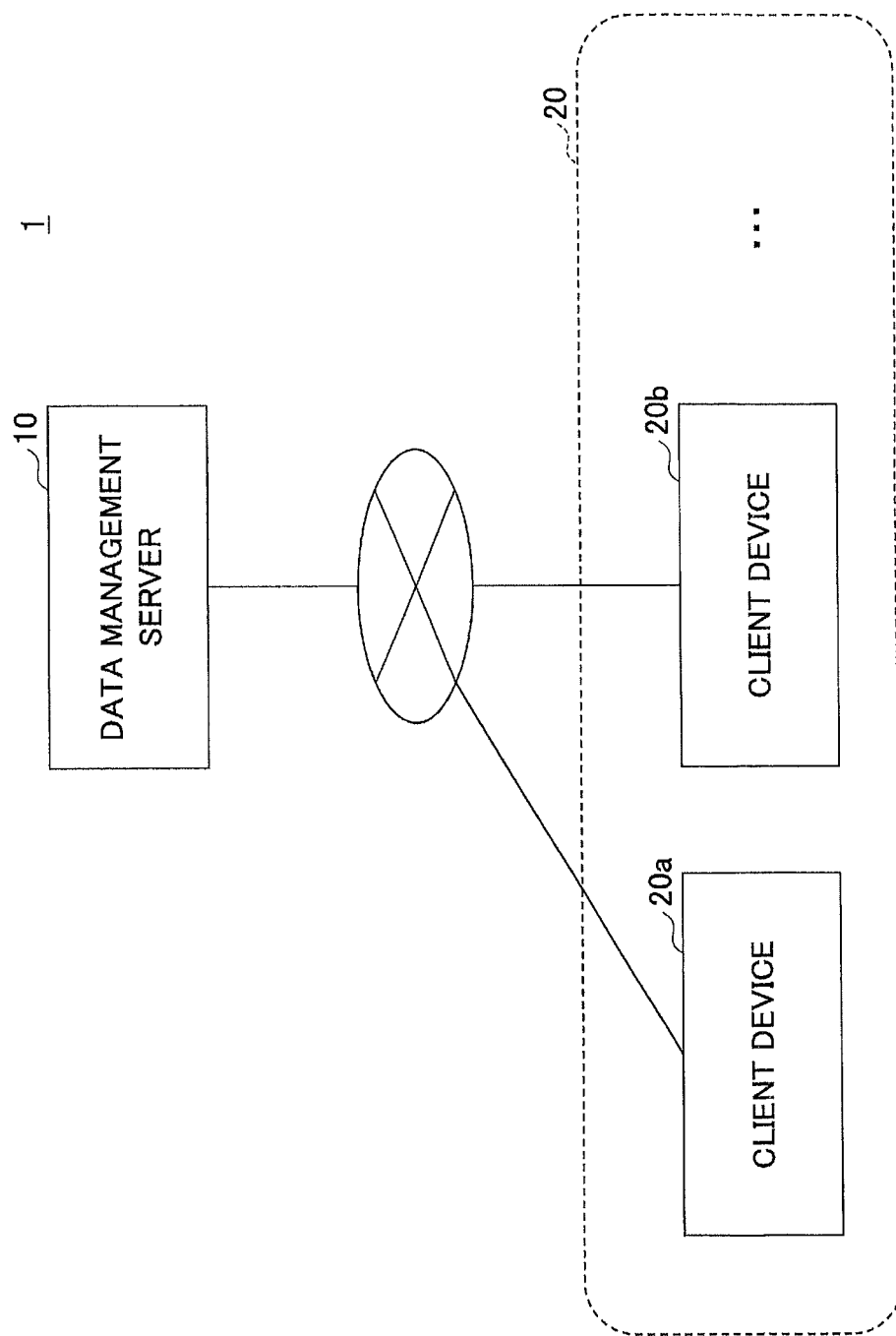
FIG. 1 illustrates a configuration example of a data management system according to an embodiment of the present invention.

Preferred embodiments of the present invention will be explained with reference to accompanying drawings. FIG. 1 illustrates a configuration example of a data management system according to an embodiment of the present invention. In a data management system 1 illustrated in FIG. 1, a data management server 10 and at least one client device 20 are connected to each other via a network such as LAN (Local Area Network) or the Internet such that communication is possible.

The data management server 10 is a computer for managing data. A plurality of computers may constitute the data management server 10. For example, the deliverable created by a development process of a product such as electronic components of an automobile, is the data that is the management target. The deliverable may be, for example, document data, drawing data, or image data. However, the data that is the management target need not be limited to a particular type of data.

The client device 20 is a computer used for operating on the data managed by the data management server 10. A PC (Personal Computer), a tablet terminal, a smartphone, or a feature phone may be used as the client device 20.

Figure 2:
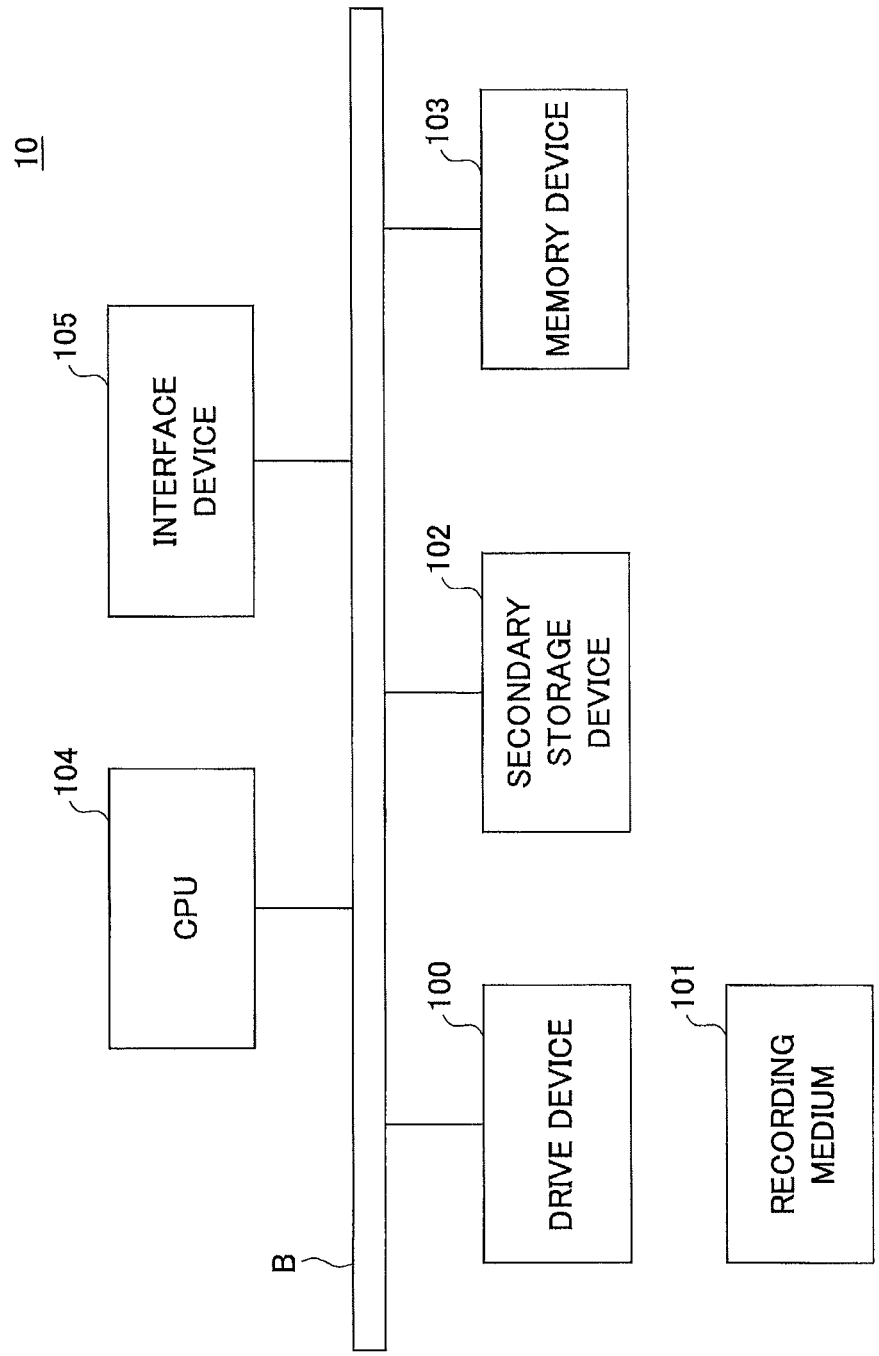
FIG. 2 illustrates an example of a hardware configuration of a data management server according to an embodiment of the present invention.

FIG. 2 illustrates an example of a hardware configuration of the data management server 10 according to an embodiment of the present invention. The data management server 10 illustrated in FIG. 2 includes a drive device 100, a secondary storage device 102, a memory device 103, a CPU 104, and an interface device 105, which are connected to each other via a bus B.

Programs for realizing processes at the data management server 10 are provided by a recording medium 101. When the recording medium 101 storing a program is set in the drive device 100, the program is installed in the secondary storage device 102 from the recording medium 101 via the drive device 100. However, a program need not be installed from the recording medium 101; a program may be downloaded from another computer via the network. The secondary storage device 102 stores the installed programs as well as files and data that are needed.

The memory device 103 reads a program from the secondary storage device 102 and stores the program, when an instruction to activate the program is given. The CPU 104 executes functions relevant to the data management server 10 according to programs stored in the memory device 103. The interface device 105 is used as an interface for connecting to the network.

Note that examples of the recording medium 101 are portable recording media such as a CD-ROM, a DVD disk, and a USB memory. Furthermore, examples of the secondary storage device 102 are HDD (Hard Disk Drive) and a flash memory. Both the recording medium 101 and the secondary storage device 102 correspond to a computer-readable recording medium.

Note that the data management server 10 may be a computer system including a plurality of computers. Furthermore, the client device 20 may also have hardware as illustrated in FIG. 2. Furthermore, the client device 20 may include an input device for receiving input from a user and a display device for displaying information to the user.

Figure 3:
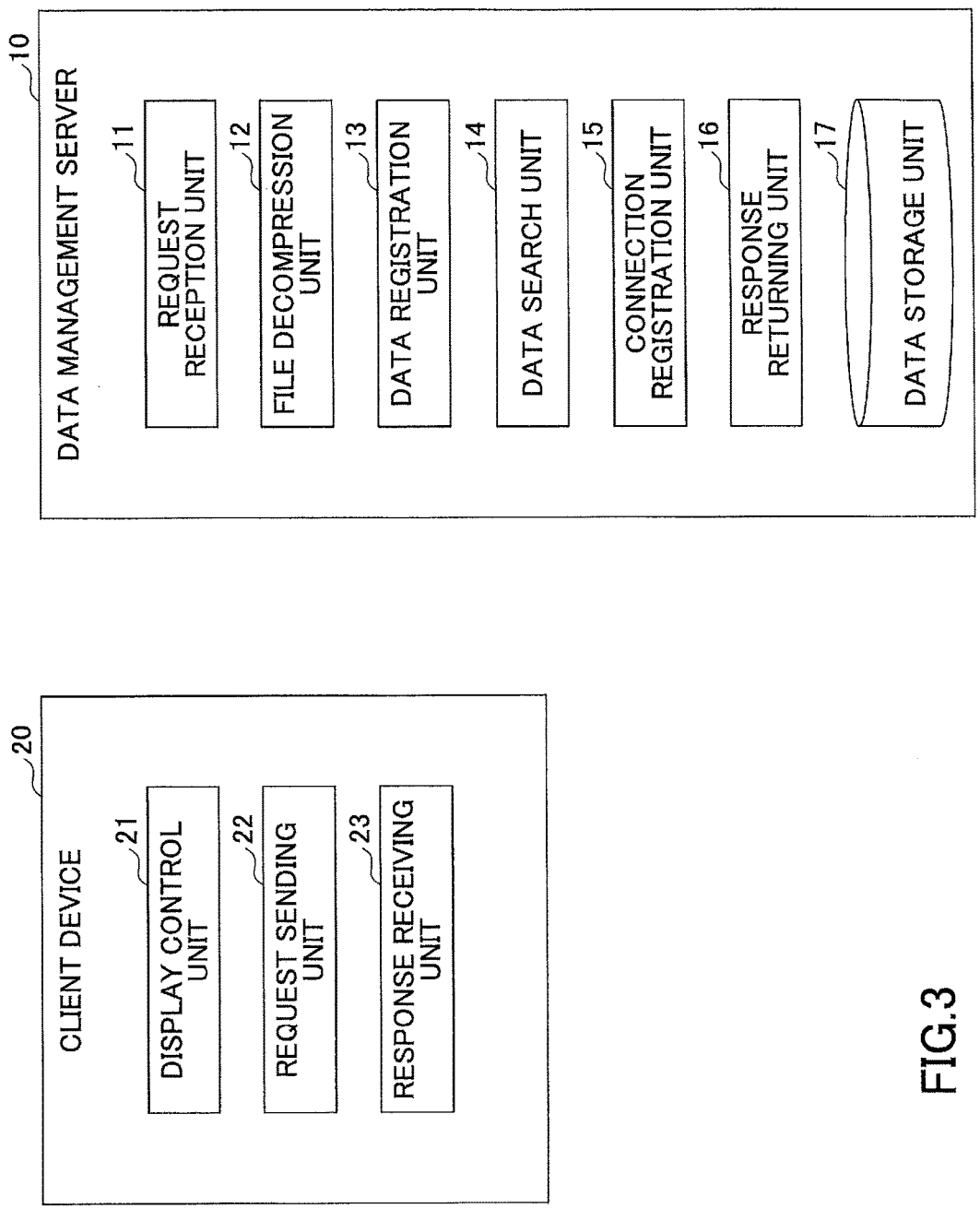
FIG. 3 illustrates an example of a functional configuration of the data management system according to an embodiment of the present invention.

FIG. 3 illustrates an example of a functional configuration of the data management system 1 according to an embodiment of the present invention. In FIG. 3, the data management server 10 includes a request reception unit 11, a file decompression unit 12, a data registration unit 13, a data search unit 14, a connection registration unit 15, and a response returning unit 16. These units are realized as one or more programs installed in the data management server 10 cause the CPU 104 to execute processes. The data management server 10 also includes a data storage unit 17. The data storage unit 17 may be realized by, for example, the secondary storage device 102 or a storage device connected to the data management server 10 via the network.

The request reception unit 11 receives a request from the client device 20. The file decompression unit 12 decompresses an archive file, when the file registered in the data storage unit 17 is an archive file. The data registration unit 13 registers data in the data storage unit 17, when a process to register data is needed in response to a request from the client device 20. The data search unit 14 searches for data from the data storage unit 17, when a process to search for data is needed in response to a request from the client device 20. The connection registration unit 15 registers, in the data storage unit 17, a record indicating the connection between data items that are connected, when a connection needs to be generated or set between data items (hereinafter, unified as "set"), in response to a request from the client device 20. In the present embodiment, the setting of a connection for the data corresponds to an example of associating data.

The response returning unit 16 returns, to the client device 20, the execution results of processes performed by the file decompression unit 12, the data registration unit 13, the data search unit 14, and the connection registration unit 15.

The client device 20 includes a display control unit 21, a request sending unit 22, and a response receiving unit 23. The display control unit 21 displays, on a display device, a screen for receiving an instruction to operate on data that is the management target. The request sending unit 22 sends, to the data management server 10, an operation request according to the operation instruction input via the screen displayed by the display control unit 21. The response receiving unit 23 receives a response returned from the data management server 10, according to the operation request sent by the request sending unit 22. The information included in the response is displayed by the display control unit 21.

The client device 20 includes a display control unit 21, a request sending unit 22, and a response receiving unit 23. The display control unit 21 displays, on a display device, a screen for receiving an instruction to operate data that is the management target. The request sending unit 22 sends, to the data management server 10, an operation request according to the operation request input via the screen displayed by the display control unit 21. The response receiving unit 23 receives a response returned from the data management server 10, according to the operation request sent by the request sending unit 22. The information included in the response is displayed by the display control unit 21.

Figure 4:
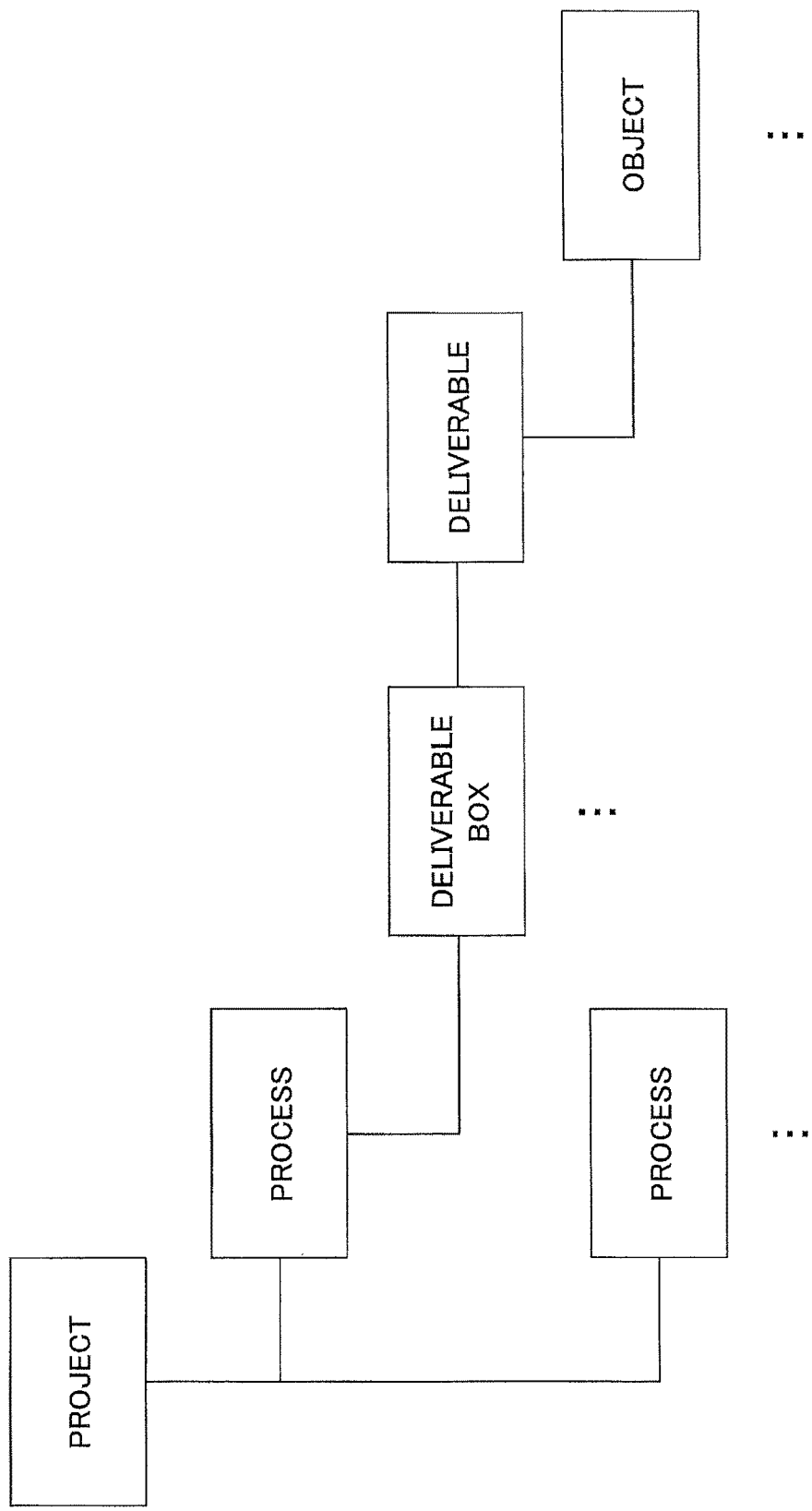
FIG. 4 illustrates a management system of data according to an embodiment of the present invention.

Next, a description is given of the management system of data that is the management target, according to the present embodiment. FIG. 4 illustrates a management system of data according to the present embodiment.

In FIG. 4, a project is a concept corresponding to a single product that is the development target. One or more processes belong to the project. A process is a concept corresponding to each stage of the development process of the product. One or more deliverable boxes belong to each process. The deliverable box is a concept expressing a box for storing the deliverable. Therefore, a deliverable belongs to a deliverable box. In the present embodiment, one deliverable box is prepared for each deliverable. That is to say, one deliverable may be stored in each deliverable box. However, a plurality of deliverables may be stored in a single deliverable box.

As described above, in the present embodiment, the storage destination of the deliverable is expressed by using a hierarchal structure constituted by a project, processes, and deliverable boxes. This hierarchal structure is referred to as a parent and child relationship. Note that data expressing a project, a process, a deliverable box, and a deliverable, is managed as records of a database in the data storage unit 14. For example, when a RDB (Relational Database) is used, a project is managed as records of a table (hereinafter, "project table") having a format for a project. A process is managed as records of a table (hereinafter, "process table") having a format for a process. A deliverable box is managed as a record of a table (hereinafter, "deliverable box table") having a format for a deliverable box. A deliverable is managed as a record of a table (hereinafter, "deliverable table") having a format for a deliverable.

Furthermore, in FIG. 4, an object is indicated as data belonging to a lower layer of the deliverable. An object is an element of a deliverable, which is extracted from the deliverable, in response to a user's instruction. For example, when the deliverable is a requirement definition document, each requirement is extracted as one object. The data expressing an object is managed as a record of a database, similar to other data. Specifically, the object is managed as a record of a table (hereinafter, "object table") having a format for an object.

Furthermore, when a deliverable is an archive file including a plurality of files, the data corresponding to each file and folder included in the archive file is also handled as an object. The archive file may be a compressed file of a zip format, or a file that is formed by integrating (archiving) the respective files into a single file without being compressed. That is to say, an archive file may be generated by integrating a plurality of files and performing a compression process on the files, or an archive file may be generated by integrating a plurality of files. Note that the file format of an archive file is not limited to a particle format.

In the present embodiment, "data" is a record of a project, a process, a deliverable box, a deliverable, and an object. Among these, the project, the process, and the deliverable box are data constituting the storage destination of the deliverable, and are thus expressed as a folder with respect to the user. That is to say, a project is expressed as a folder storing one or more processes. A process is expressed as a folder storing one or more deliverable boxes. A deliverable box is expressed as a folder storing a deliverable. Thus, in the present embodiment a "folder" is used as a term meaning the highest conception of a project, a process, and a deliverable box.

In the present embodiment, the concept of distinguishing a project, a process, a deliverable box, and an object is referred to as a data type.

The parent and child relationship of the project, the process, the deliverable box, etc., is defined in advance by, for example, an administrator. The developer of a product creates a deliverable corresponding to the deliverable box as the development process proceeds, and registers the deliverable in the deliverable box. Accordingly, it is possible to manage the deliverables, such that it is easily recognized that the deliverables needed for development are created without any omission.

Between the respective data items, a connection may be set. One of the two data items connected by one connection is the connection source, and the other data item is the connection destination. That is to say, there is a direction in a connection.

The connection is also managed as a record of a table (hereinafter, "connection table") for managing connections in the data storage unit 17, similar to the data. A record of connection includes an identification name of the data of the connection source, and the data name of the data of the connection destination.

Figure 5:
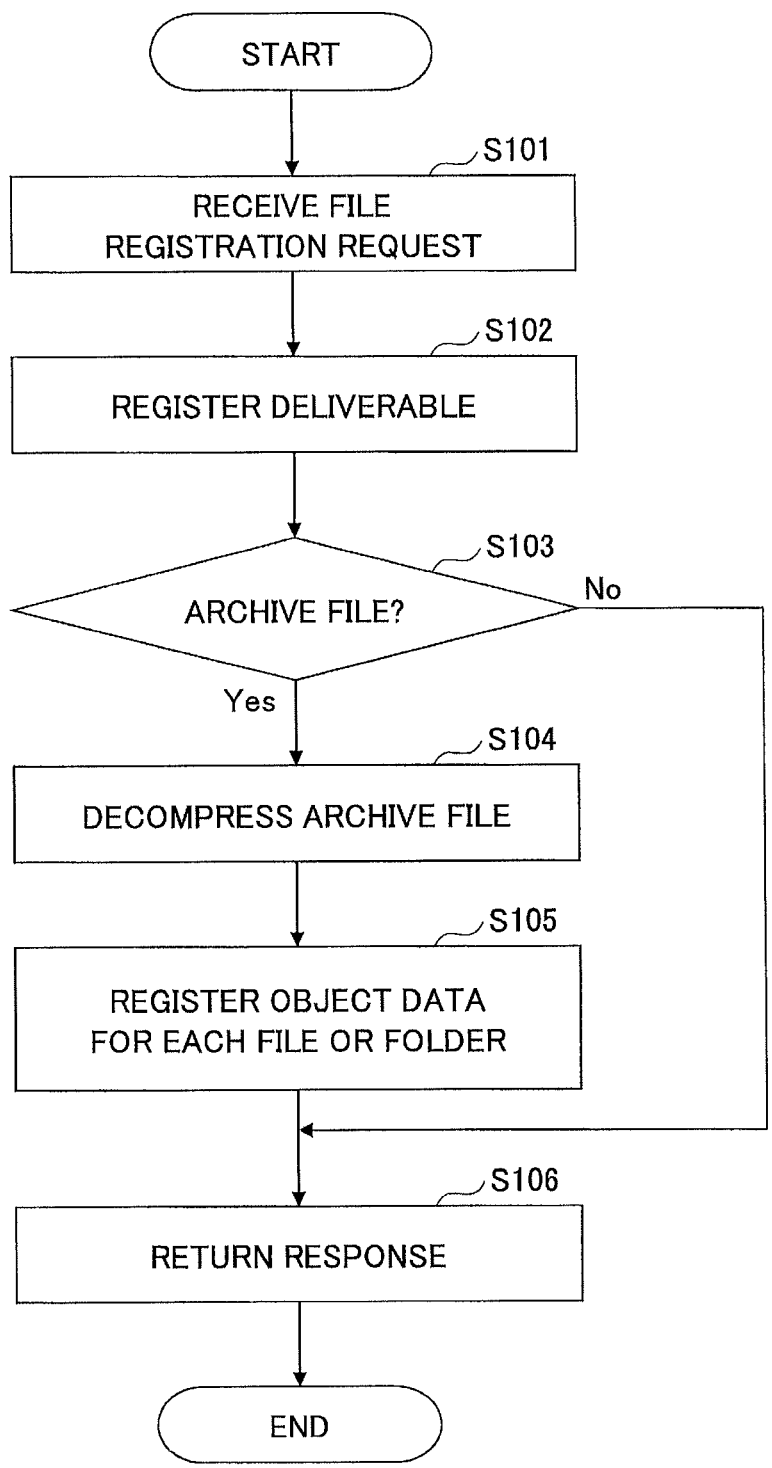
FIG. 5 is a flowchart for describing an example of processing procedures of a process of registering deliverables, executed by the data management server.

In the following, a description is given of processing procedures that are executed in the data management system 1. FIG. 5 is a flowchart for describing an example of processing procedures of a process of registering deliverables, executed by the data management server 10.

In step S101, the request reception unit 11 receives, from the client device 20, a request to register a file as a deliverable, in a certain deliverable box. For example, the request to register a file is sent, from the client device 20, according to an operation of a user with respect to a data operation screen which is displayed by the display control unit 21 of the client device 20. Note that the registration of a deliverable in a deliverable box is an example of storing a file in a folder.

Figure 6:
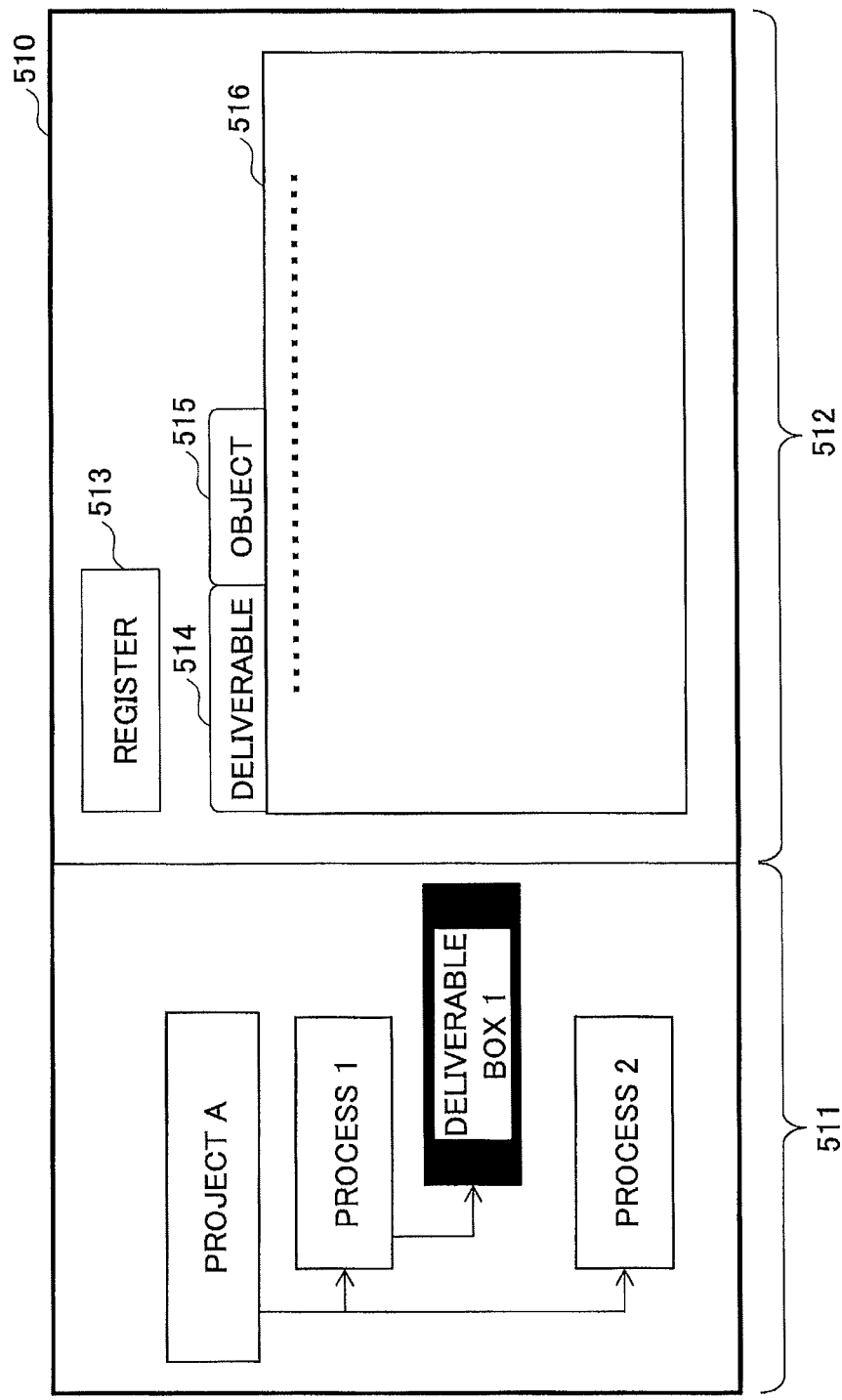
FIG. 6 illustrates a data operation screen.

FIG. 6 illustrates a data operation screen. In FIG. 6, a data operation screen 510 includes a tree display area 511 and an information display area 512.

The tree display area 511 displays tree components indicating the parent and child relationship of the data items, assuming that each data item is a node. For example, the user double-clicks a certain node to expand the node. At the lower level of the expanded node, there is displayed a node of a data item belonging to the data item relevant to the expanded node. In FIG. 6, "project A" is expanded, and "process 1" and "process 2" are displayed at the lower level of the "project A". Furthermore, "process 1" is expanded, and "deliverable box 1" is displayed at the lower level of "process 1".

The information display area 512 displays, for example, information on a data item relevant to a node that has been selected in the tree display area 511. The information display area 512 includes a registration button 513, a deliverable tab 514, an object tab 515, and a window 516.

The deliverable tab 514 and the object tab 515 are tabs that are displayed in the tree display area 511, when a deliverable box is selected. The window 516 is an area for displaying information on a data item relevant to a node that has been selected in the tree display area 511. When the deliverable tab 514 is selected, information on a file that is a deliverable registered in the deliverable box selected in the tree display area 511, is displayed in the window 516. When the object tab 515 is selected, information on an object that is extracted from a file as a deliverable registered in the deliverable box selected in the tree display area 511, is displayed in the window 516.

The registration button 513 is a button for receiving an instruction to register a file in a deliverable box relevant to a node that has been selected in the tree display area 511. For example, when the registration button 513 is pressed by the user in a state where the node relevant to any one of the deliverable boxes is selected in the tree display area 511, the display control unit 21 causes the display unit of the client device 20 to display a file specification screen.

FIG. 7 illustrates a display example of a file specification screen. In FIG. 7, the file specification screen 520 is a screen for receiving a specification of a file that is a registration target, and includes a file name input area 521, a reference button 522, and a registration button 523.

The file name input area 521 is an area where the file name of the file is input. When the reference button 522 is pressed, a screen indicating the configuration of a file system of the client device 20 is displayed. The user may select a file from the screen. The file name of the selected file is input in the file name input area 521. When the registration button 523 is pressed in a state where a file name is input in the file name input area 521, the request sending unit 22 sends, to the data management server 10, a request to register the file, including the ID of the deliverable box of the registration destination, the file name of the file that is the registration target, and the entity of the file that is the registration target. In step S101, this registration request is received. Note that the ID of the deliverable box is the identification information stored in the data storage unit 17 with respect to the data of the corresponding deliverable box. The ID of the data relevant to each node displayed in the tree display area 511 is reported to the client device 20.

Next, the data registration unit 13 stores the file of the registration target as the deliverable, in the data storage unit 17 (step S102). Specifically, in the deliverable table stored by the data storage unit 17, one record corresponding to the file is registered.

FIG. 8 illustrates an example of a record registered in the deliverable table. In FIG. 8, the record of the deliverable table includes items such as an ID, revision, and file name. The value of the ID item is the ID of the deliverable box to which the deliverable belongs. That is to say, the value of the ID item is the ID stored for the deliverable box in the deliverable box table. In the present embodiment, "WPB0001" is the ID of the "deliverable box 1" in FIG. 6. The value of the revision item is the revision of the deliverable. In the present embodiment, revision control is performed with respect to the deliverable. Specifically, every time a file is registered in the same deliverable box, the revision of the deliverables registered in the deliverable box is updated, and the files belonging to the deliverable box are updated by being overwritten. The initial value of the revision is, for example, "0001". The value of the file name item is the file name of the deliverable.

In step S102, for each ID item, the received ID is registered, "0001" is registered in the revision item, and a record in which the received file name is registered in the file name item is added to the deliverable table. Furthermore, the entity of the file is stored in the data storage unit 17 in association with the record.

Next, the data registration unit 13 determines whether the file that is the registration target received in the registration request, is an archive file (step S103). This determination may be made based on the extension of the file name of the file. That is to say, when the file name includes a predetermined extension, it may be determined that this file is an archive file.

When the file that is the registration target is not an archive file (NO in step S103), the process proceeds to step S106. When the file that is the registration target is an archive file (YES in step S103), the file decompression unit 12 decompresses the archive file (step S104). That is to say, the file group and the path name of the file group stored in the archive file are extracted or acquired (hereinafter, unified as "extract"). When the extracted file group has a hierarchal structure, hierarchal structure information indicating the hierarchal structure is also extracted from the archive file. Specifically, a path name according to the hierarchal structure is extracted with respect to each file and folder, as an example of the hierarchal structure information. A folder is defined for forming the hierarchal structure.

For example, it is assumed that the archive file that is the registration target has a configuration as illustrated in FIG. 9. FIG. 9 illustrates a configuration example of an archive file that is the registration target. FIG. 9 illustrates a configuration of the archive file whose file name is "Sample.zip", by a tree format in which files or folders are nodes.

Specifically, Sample.zip includes a "Sample" folder as the route folder. The Sample folder includes a "Sample/Sample1" folder and a "Sample/SampleFile1.txt" file. The "Sample/Sample1" folder includes a "Sample/Sample1-1" folder and a "Sample/Sample1-2" folder. Below the "Sample/Sample1-1" folder, a "Sample/Sample1-1/SamleFile2.txt" file is included.

In step S104, the files and folders are extracted from the archive file together with the above path names, as examples of identification information or hierarchal structure information of the files or folders.

Next, the data registration unit 13 stores the extracted files and folders as objects in the data storage unit 17 (step S105). Specifically, in the object table stored by the data storage unit 17, records corresponding to the files and folders are registered.

FIG. 10 illustrates examples of records registered in an object table. A record of an object table includes items such as ID, revision, OBjID, parent ObjID, name, and type. A value of the ID item is an ID of the deliverable box to which the deliverable, which is the extraction source of the object, belongs. A value of the revision item is the revision of the deliverable from which the object is extracted. Note that by the value of the ID item and the value of the revision item, the deliverable that is the extraction source of the object is identified. A value of the OBjID item is identification information of the object. For example, the OBjID of each object is generated by the data registration unit 13, when the record of the object is registered in the object table. A value of the parent OBjID is the OBjID of an object that is to be the parent of the object. That is to say, objects may have a parent and child relationship with each other. In the present embodiment, the hierarchical relationship or the containment relationship in the hierarchal structure in the archive file becomes the parent and child relationship between objects. That is to say, by the parent OBjID, the folder of a higher level in the archive file is identified. A value of the name item is the name of the object. In the present embodiment, the name of an object is the file name or the folder name of the file or folder extracted from the archive file. A value of the type item is information indicating whether the object is a file or a folder.

Note that FIG. 10 illustrates a state where the files and folders illustrated in FIG. 9 are registered in an object table.

Next, the response returning unit 16 returns a response to the registration request received in step S101 (step S106). In the response, for example, the path name of a newly registered deliverable may be included. For example, when the name of the deliverable is "Sample.zip" and the deliverable box 1 in FIG. 6 is the registration destination, "Project A/Process 1/deliverable box 1/Sample.zip" and the data (record) of the deliverable may be returned as the path name of the deliverable.

The response is received by the response receiving unit 23 of the client device 20. The display control unit 21 updates the display contents of the data operation screen 510 based on the response. For example, the deliverable tab 514 of the information display area 512 is selected, and information included in the received response is displayed in the window 516.

Figure 11:
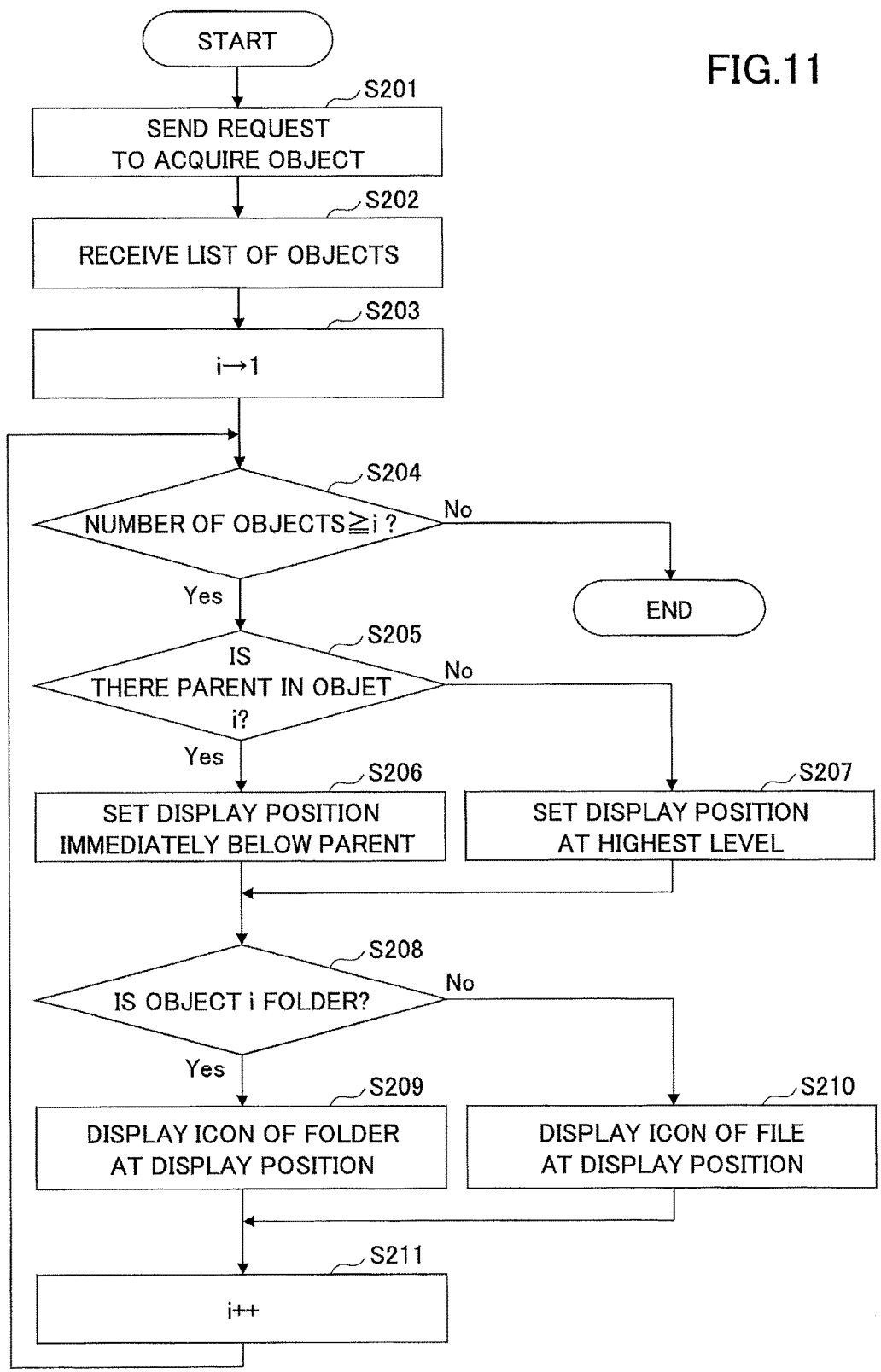
FIG. 11 is a flowchart of an example of processing procedures executed by a client device with respect to displaying objects.

Next, a description is given of a process of displaying an object. FIG. 11 is a flowchart of an example of processing procedures executed by the client device 20 with respect to displaying objects. In this example, it is assumed that the archive file having the configuration illustrated in FIG. 9 is registered in the deliverable box 1 illustrated in FIG. 6.

In the tree display area 511 (FIG. 6) of the data operation screen 510, when the object tab 515 is selected in a state where the "deliverable box 1" is selected, the request sending unit 22 sends a request to acquire an object, including the ID of the "deliverable box 1", to the data management server 10 (step S201). That is to say, the acquisition of a list of objects extracted from the file registered in the "deliverable box 1", is requested.

Next, the response receiving unit 23 receives, from the data management server 10, a response to the request to acquire an object (step S202). For example, the response includes a list of objects as illustrated in FIG. 10. Note that in the list of objects, the objects are listed in an order such that the parent objects are listed before the child objects.

Next, the display control unit 21 assigns 1 to a variable i (step S203). A variable i is a variable indicating the object that is the processing target. In the following, in the received list of objects, the "i"th object is referred to "object i".

Next, the display control unit 21 determines whether the number of objects included in the received list of objects is greater than or equal to i (step S204). When the number of objects is greater than or equal to i (YES in step S204), the display control unit 21 determines whether a value is registered in the "parent OBjID" of the record of the object i (step S205). That is to say, it is determined whether there is a parent object in object i.

When a value is registered in the "parent OBjID" (YES in step S205), the display control unit 21 sets the display position of object i to be immediately below the object relevant to the "parent OBjID" (step S206). Meanwhile, when a value is not registered in the "parent OBjID" (NO in step S205), the display control unit 21 sets the display position of object i to be at the highest level (step S207).

Next, the display control unit 21 determines whether the value of the "type" of the record of the object i is a "folder" (step S208). When the value of the "type" is a "folder" (YES in step S208), the display control unit 21 displays the icon of the folder at the display position determined in step S206 or S207, and displays the "name" of the object i adjacent to the icon (step S209). When the value of the "type" is a "file" (NO in step S208), the display control unit 21 displays the icon of the file at the display position determined in step S206 or S207, and displays the "name" of the object i adjacent to the icon (step S210).

Next, the display control unit 21 increments the variable i by one (step S211), and repeats step S204 and onward. When the value of the variable i becomes higher than the number of objects (NO in step S204), the process of FIG. 11 is ended.

For example, as a result of the process of FIG. 11, a tree structure as illustrated in FIG. 9 is displayed in the window 516 of the data operation screen 510, based on the group of records illustrated in FIG. 10. As a result, the user may confirm the parent and child relationship between the objects extracted from the deliverable.

Figure 12:
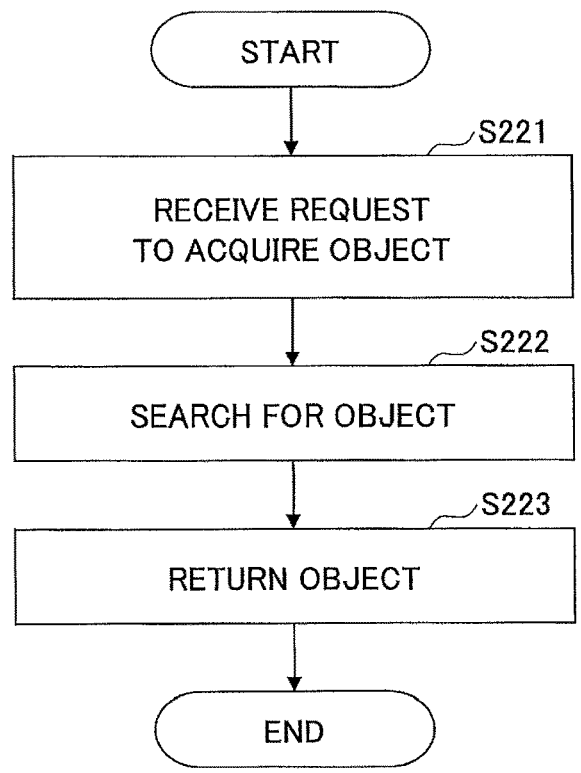
FIG. 12 is a flowchart for describing an example of processing procedures executed by the data management server with respect to displaying objects.

Next, a description is given of a process performed by the data management server 10. FIG. 12 is a flowchart for describing an example of processing procedures executed by the data management server 10 with respect to displaying objects.

In step S221, the request reception unit 11 receives a request to acquire an object, sent from the client device 20 in step S201 of FIG. 11. The acquisition request includes the ID of the deliverable box selected in the tree display area 511 of the data operation screen 510.

Next, the data search unit 14 searches the object table (FIG. 10) for a group of records including the ID included in the acquisition request as the value of the ID item (step S222). Next, the response returning unit 16 returns the group of records found as a result of the search, to the client device 20 (step S223).

By executing the processes of FIGS. 11 and 12, the user is able to set the object as the operation target. For example, the user is able to give an instruction to set a connection between objects.

The two objects for which a connection is set may belong to the same project or may belong to different projects. When a connection is set between objects belonging to different projects, for example, a data operation screen 510 (see FIG. 6) may be displayed for each project. Alternatively, in a single screen, areas having the same configuration as the data operation screen 510 may be arranged for the respective projects. In this case, the processes of FIGS. 11 and 12 are to be executed for each of the deliverable boxes of the projects. Accordingly, the user is able to select objects belonging to different projects, as targets to be connected. That is to say, the processes of FIGS. 11 and 12 are processes for outputting or displaying an object as a candidate to be connected with another object (candidate with which association is possible).

For example, the setting of a connection between two objects may be instructed by dragging and dropping an icon of an object belonging to a certain project at an icon of an object belonging to another project. In this case, the icon that is dragged is the connection source, and the icon where the dragged icon is dropped is the connection destination.

Alternatively, a "set connection" menu (not illustrated) may be selected in a state where the icons of two objects for which a connection is to be set are selected. In this case, the display control unit 21 displays a connection setting screen as illustrated in FIG. 13, for example.

Figure 13:
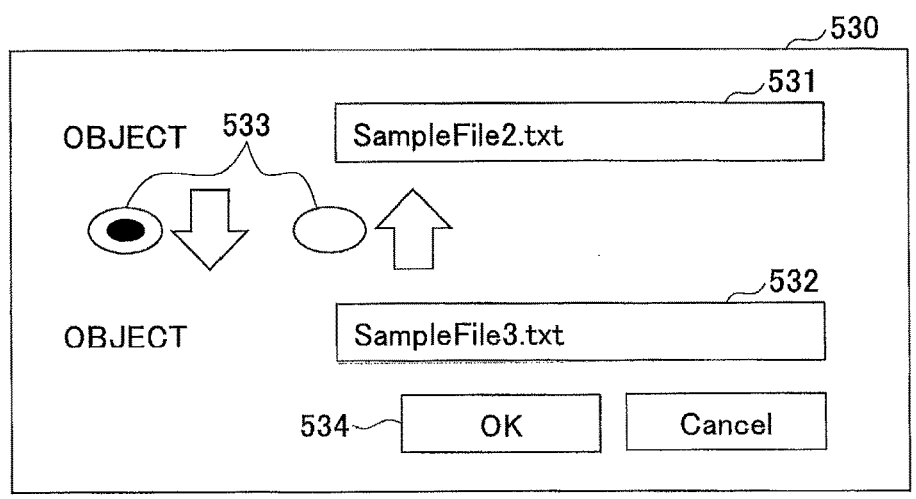
FIG. 13 illustrates a display example of a connection setting screen.

FIG. 13 illustrates a display example of a connection setting screen 530. In FIG. 13, the connection setting screen 530 includes name display areas 531 and 532, radio buttons 533, and an OK button 534.

The name display areas 531 and 532 are areas where the names of one object and another object that are selected as targets for setting connection, are displayed. The radio buttons 533 are radio buttons for selecting the direction of the connection. When the left option is selected, the object in the name display area 531 is the connection source. When the right option is selected, the object in the name display area 532 is the connection destination. When the OK button 534 is pressed, an instruction to set a connection is input.

Note that the data type to be a candidate of connection with respect to a certain object, is not limited to an object. For example, a project, a process, a deliverable box, or a deliverable may be connected to a certain object. In this case, an object is selected as one of the data items to be connected, and a data item other than an object is selected as the other one of the data items to be connected.

Furthermore, an object may be further extracted from the file extracted from the archive file. In this case, in addition to the file name of the file, identification information of the object is acquired, and this object may also be displayed as a candidate of a target for setting a connection. Then, with respect to the object, a connection may set with a project, a process, a deliverable box, a deliverable, or another object.

In response to an instruction to set a connection as described above, the request sending unit 21 of the client device 20 sends a request to set a connection, to the data management server 10. A description is given of a process executed by the data management server 10 in response to this setting request.

Figure 14:
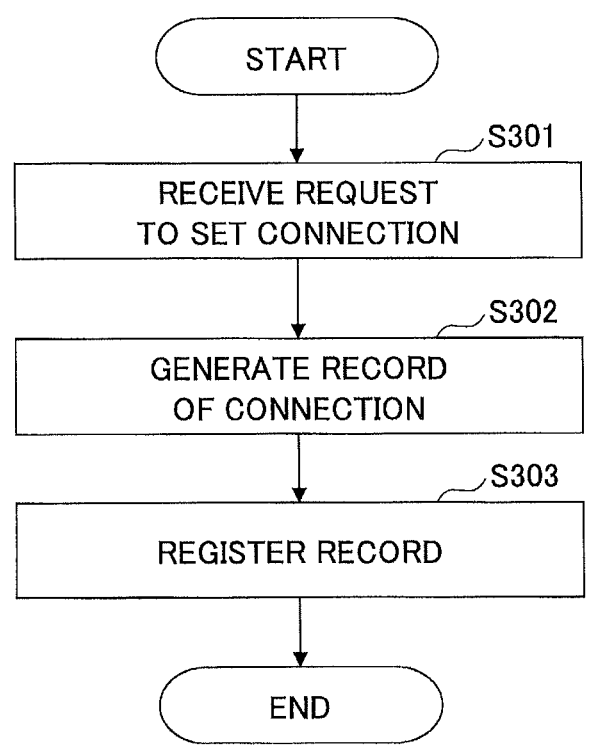
FIG. 14 is a flowchart for describing an example of processing procedures of a process of setting a connection, executed by the data management server.

FIG. 14 is a flowchart for describing an example of processing procedures of a process of setting a connection, executed by the data management server 10.

In step S301, the request reception unit 11 receives a request to set a connection. The request to set a connection includes the OBjID of the object that is the connection source, and the OBjID of the object that is the connection destination.

Next, the connection registration unit 15 generates a record corresponding to the connection relevant to the setting request (step S302). Next, the connection registration unit 15 registers the record in a connection table stored by the data storage unit 17 (step S303).

FIG. 15 illustrates an example of a record registered in a connection table. In FIG. 15, the recording of the connection table includes items such as a source ID, a destination ID, a source revision, a destination revision, a source OBjID, and a destination OBjID.

A value of the source ID item is an ID of the deliverable box to which the object of the connection source belongs. The destination ID is the ID of the deliverable box to which the object of the connection destination belongs. Note that the deliverable box to which an object belongs is a deliverable box that is the registration destination of the deliverable that is the extraction source of the object.

A value of the source revision item is the revision of the deliverable that is the extraction source of the object that is the connection source. A value of the destination revision item is the revision of the deliverable that is the extraction source of the object that is the connection destination. A value of the source OBjID item is the OBjID of the object that is the connection source. A value of the destination OBjID item is the OBjID of the object that is the connection destination.

The values of the source OBjID and the destination OBjID are included in the request to set a connection received in step S301. The values of the source ID, the destination ID, the source revision, and the destination revision may be identified in the object table (FIG. 10) based on a record including the source OBjID or the destination OBjID.

As described above, objects may be associated with each other by a connection. In the present embodiment, an object is a file or a folder extracted from the archive file that is a deliverable. That is to say, according to the present embodiment, data may be associated with other data not only in units of archive files but also in units of files or folders stored in the archive file.

Next, a description is given of a processing procedure executed when, for example, a new deliverable is registered in a deliverable box in which a deliverable (file) is already registered, i.e., in a case where revision-up of a deliverable is performed.

Figure 16:
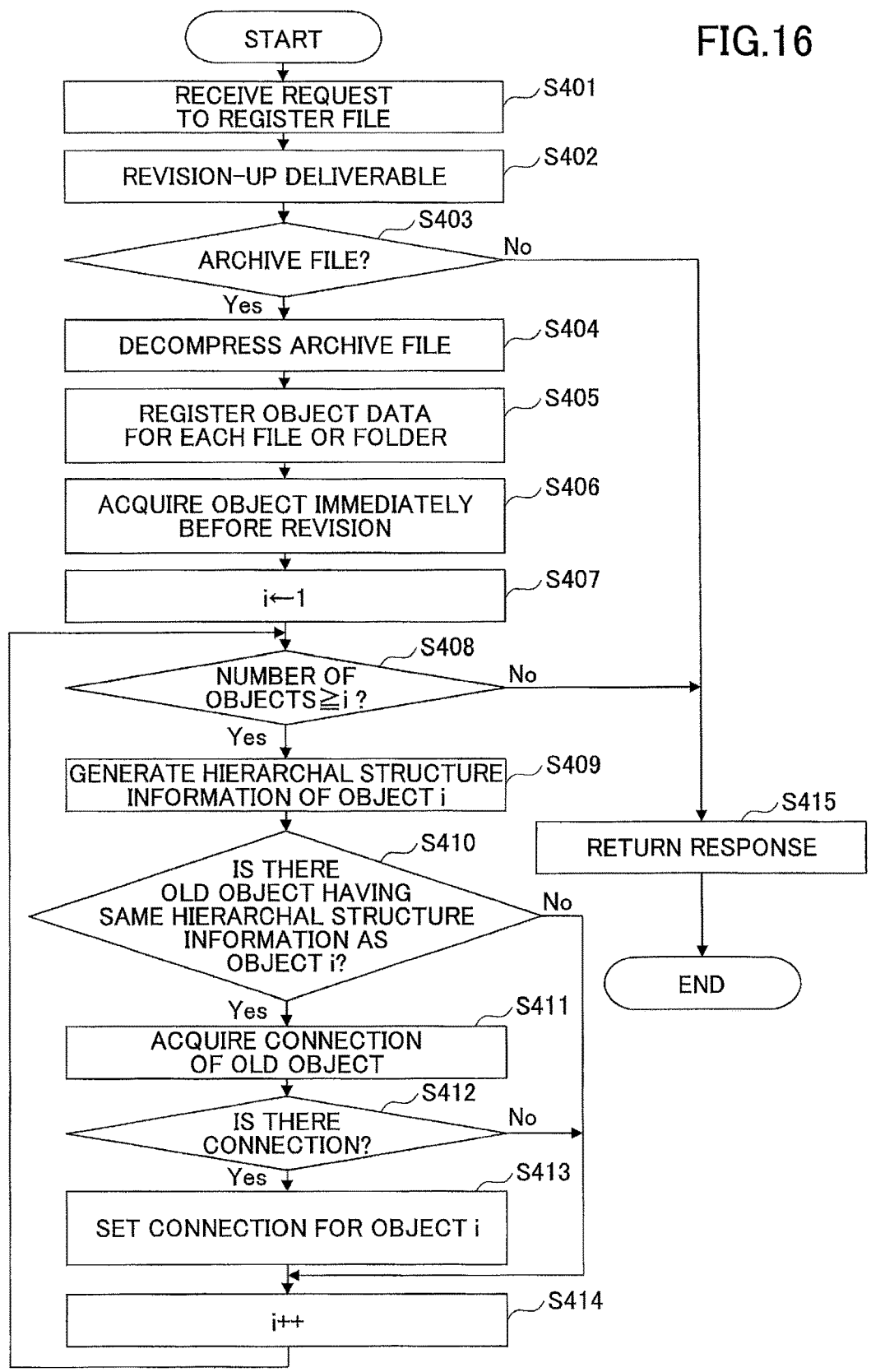
FIG. 16 is a flowchart for describing an example of processing procedures of a revision-up process of a deliverable, executed by the data management server.

FIG. 16 is a flowchart for describing an example of processing procedures of a revision-up process of a deliverable, executed by the data management server 10.

In step S401, the request reception unit 11 receives, from the client device 20, a request to register a file as a deliverable, in a certain deliverable box. Step S401 is the same as step S101 of FIG. 5. Therefore, the registration request includes the ID of the deliverable box that is the registration destination, the file name of the file that is the registration target, and the entity of the file that is the registration target.

Next, the data registration unit 13 performs revision-up on the deliverable that is registered in the deliverable box that is the registration destination (step S402). Specifically, the data registration unit 13 registers a record of a new revision, in the deliverable table. Note that the data registration unit 13 executes step S102 and onward of FIG. 5 when a deliverable is not registered in the deliverable box that is the registration destination, and executes step S402 and onward of FIG. 16 when a deliverable is registered.

Figures 17, 18:
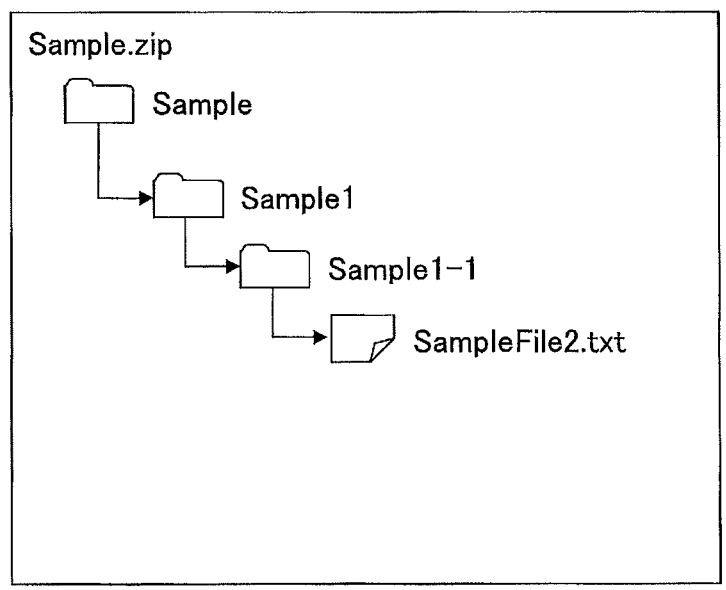
FIG. 17 illustrates an example of a record that is registered by the revision-up of a deliverable.
FIG. 18 illustrates an example of a configuration of an archive file that is the new registration target.

FIG. 17 illustrates an example of a record that is registered by the revision-up of a deliverable. In FIG. 17, a first record (hereinafter, "old record") is the record illustrated in FIG. 8. The second record (hereinafter, "new record" is an example of a record registered in step S402. The value of the ID item of the old record is the same as the value of the ID item of the new record. This is because both are records with respect to deliverables that are registered in the same deliverable box. Meanwhile, the value of the revision item of the new record is obtained by incrementing that of the old record by one. By registering a record in which the value of the revision item is updated, it is indicated that the corresponding deliverable has been subjected to revision-up. Note that in the example of FIG. 17, the file name of the new record and the file name of the old record are the same; however, it may not be a requirement of the revision-up that the file name of the deliverable newly registered is the same as the file name of the deliverable before the revision. For example, even when the file name of the file that is newly registered is "Sample2.zip", revision-up may be performed. In this case, "Sample2.zip" is registered as the file name item of the new record.

Note that the record expressing the deliverable after the revision-up of the deliverable is performed, is the new record. The old record has a meaning of history information, but is not effective as a record indicating the newest state of the deliverable. Therefore, for example, when the deliverable is the target of search, the new record that is the newest revision is found as a result of the search.

The following steps S403 through S405 are the same as steps S103 through S105 of FIG. 5. However, the value of the revision item of the record of each object registered in step S405 is a value obtained by incrementing the present newest revision by one. That is to say, revision-up is also performed for the object.

It is assumed that an archive file that is newly registered has a configuration as illustrated in FIG. 18. FIG. 18 illustrates an example of a configuration of an archive file that is the new registration target. When FIG. 18 is compared with FIG. 9, it is found that FIG. 18 does not include a "Sample/SampleFile1.txt" file or a "Sample/Sample1/Sample1-2" folder, which are included in FIG. 9. However, the configuration of the archive file that is newly registered may be the same as that of the archive file that is already registered.

Figure 19:
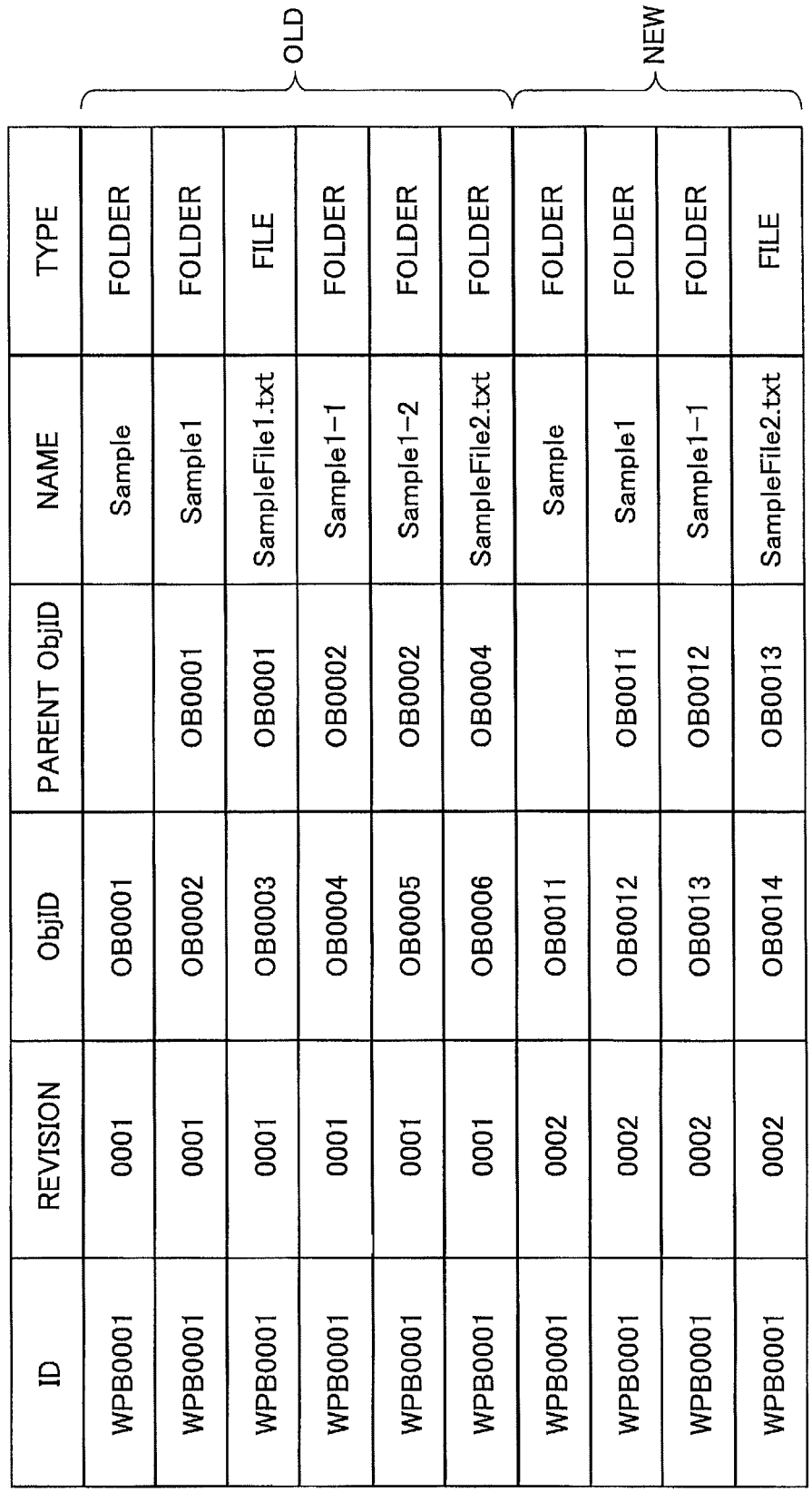
FIG. 19 illustrates examples of records that are registered by the revision-up of an object.

In step S405, a record of an object as illustrated in FIG. 19 is registered, in the archive file having the configuration illustrated in FIG. 18.

FIG. 19 illustrates examples of records that are registered by the revision-up of an object. In FIG. 19, the record group OLD is the record group illustrated in FIG. 10. The record group NEW indicates examples of the records that are registered in the object table in step S405.

Objects belonging to the same deliverable box have the same ID item values. Therefore, the values of ID items of the records in the record group OLD are the same as the values of ID items of the records in the record group NEW. Meanwhile, the values of revision items of the records in the record group NEW are obtained by incrementing the values of the revision items of the records in the record group OLD by one. Furthermore, as the OBjID items of the record group NEW, values that do not overlap those of the values of the OBjID items of the record group OLD, are registered. This is because OBjID is a unique value among different revisions.

Next, the data search unit 14 acquires, from the object table, a record relevant to the object of the revision immediately before the object registered in step S405 (step S406). In the example of FIG. 19, a record group OLD is acquired, which has an ID item matching the values of the record group NEW, and which has a value of a revision item that is smaller than that of the record group NEW by one.

Next, the data registration unit 13 assigns one to the variable i (step S407). The variable i is a variable indicating a record that is a processing target, in the record group NEW. In the following, an object relevant to the "i"th record in the record group NEW is referred to as "object i".

Next, the data registration unit 13 generates hierarchal structure information of the object i (step S409). The hierarchal structure information of the object i is, for example, the path name of the object i. The path name of the object i may be generated by recursively searching for a record relevant to the parent OBjID starting from the record relevant to the object i, and connecting the values of the name items of the records found as a result of the search. For example, when the value of the file name item of the record relevant to the object i is "SampleFile2.txt", a path name "Sample/Sample1/Sample1-1/SampleFile2.txt" is generated.

Next, the data search unit 14 determines whether there is a record relevant to an object by which the same path name as that of the object i is generated, in the record group OLD (step S410). For example, path names of the records included in the recording group OLD are generated, and it is determined whether there is a path name matching that of object i, among the generated path names.

When there is a corresponding record (YES in step S410), the data search unit 14 searches the connection table (FIG. 15) for a record relevant to the connection set with respect to the object (hereinafter, "old object") relevant to the corresponding record (step S411). A record relevant to a connection set with respect to the old object, is a record including the OBjID of the old object as a value of the source OBjID item or a value of the destination OBjID item.

When a recording relevant to the connection is found as a result of the search (YES in step S412), the connection registration unit 15 sets the connection with respect to the object i (step S413). That is to say, the object i is associated with an object that is associated with the old object. As a result, the connection set for the old object is taken over by the object i. Specifically, a record illustrated in FIG. 20 is registered in the connection table.

FIG. 20 illustrates an example of a record registered in the connection table by taking over the connection. In FIG. 20, the first record (hereinafter, "old record") is a record of the old object, which is the same as the record illustrated in FIG. 15. The second record (hereinafter "new record") is an example of a record registered in step S413. Note that the new record is registered when the object i is the object relevant to the last record in FIG. 19.

The values of the source ID item, the destination ID item, the destination revision ID item, and the destination OBjID item of the new record, are the same as those of the old record. Meanwhile, as the source revision item and the source OBjID of the new record, the value of the revision item and the value of the OBjID item of the record relevant to the object i are copied.

Note that FIG. 20 illustrates an example of a case where the old object is the connection source. When the old object is a connection destination, the values of the source ID item, the destination ID item, the source revision ID item, and the source OBjID item of the new record, are the same as those of the old record. Meanwhile, as the destination revision item and the destination OBjID of the new record, the value of the revision item and the value of the OBjID item of the record relevant to the object i are copied.

As described above, in an archive file that is newly registered, a connection is set for files or folders relevant to the same positioning as the positioning in the hierarchal structure in the archive file that has already been registered, such that the connection is the same as that set for the corresponding files or folders in the archive file that has already been registered. As a result, it is possible to reduce the need for the user to reset the connection.

Next, the data registration unit 13 increments the variable i by one (step S414), and repeats step S408 and onward. Note that in step S410, when there is no corresponding record (NO in step S410), or in step S411, no corresponding record is found as a result of the search (NO in step S412), step S413 is not executed.

When step S408 and onward are executed for all records belonging to the record group NEW (NO in step S408), step S415 is executed. Step S415 may be the same as step S106 of FIG. 5.

As described above, according to the present embodiment, when an archive file is registered (stored) as a deliverable in a deliverable box, the path names of the files and folders included in the archive file are extracted from the archive file. For each extracted path name, a record of an object is registered. Furthermore, the record of the object is output as a candidate of a target for setting a connection. Therefore, for each element in the archive file, the data may be associated with other data.

Furthermore, the path names extracted from the archive file correspond to information indicating the hierarchal structure of the files or folders. Based on these path names, the information indicating the hierarchal structure is registered in the object table. Specifically, according to the value of the parent OBjID item, the hierarchal structure is maintained. Therefore, when displaying the information relevant to the deliverable box in which the archive file is registered, it is possible to reproduce a hierarchal structure as illustrated in FIG. 9.

Furthermore, the connection set for objects that are already registered, is automatically taken over by objects of the same name that are newly registered. As a result, it is possible to reduce the need for the user to reset the connection.

Note that the scope to which the present embodiment is applicable is not limited to the data group or folder group managed in the management format as illustrated in FIG. 4. For example, in a management format of a typical file system, if it is possible to set the connection between files or folders, the present embodiment may be applied to the file group or folder group.

Furthermore, the screen displayed by the client device 20 may be generated by the data management server 10 by using HTML (HyperText Markup Language). For example, the processing procedures illustrated in FIG. 11 may be executed by the data management server 10. In this case, the client device 20 is to have a versatile web browser.

Alternatively, the functions of the file decompression unit 12, the data registration unit 13, the data search unit 14, and the connection registration unit 15 may be included each client device 20. That is to say, the processing procedures which are described as being executed by the data management server 10 in the present embodiment may be executed by each client device 20. In this case, each client device 20 may access the data storage unit 17 of the data management server 10 via the network.

Note that in the present embodiment, the data management server 10 is an example of a management device and a management system. The file decompression unit 12 is an example of an acquisition unit. The response returning unit 16 is an example of an output unit. The connection registration unit 15 is an example of a control unit. The object is an example of a data object.

The present invention is not limited to the specific embodiments described herein, and variations and modifications may be made without departing from the scope of the present invention.

According to an aspect of the embodiments, a management method, a management device, and a management system are provided, by which other data items may be associated for each element in an archive file.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a file management program that causes a computer, which stores a file in a folder, to execute a process comprising:

acquiring identification information of a plurality of files included in a single archive file, the archive file being stored in the folder, and the plurality of files being integrated into the archive file or integrated and compressed into the archive file;

outputting to a client device the acquired identification information of the plurality of files as candidates for each of which it is possible to be associated with another folder, or with another file, or with an individual data object included in another file; and when another archive file including still another file having identification information identical to identification information of one of the plurality of files which is specified to be associated with the another folder, or with the another file, or with the individual data object included in another file is found in the folder, implementing control to store, in a storage unit, association information to associate the still another file, instead of the one of the plurality of files, with the another folder, or with the another file, or with the individual data object included in another file, wherein the implementing includes:

generating, in response to receiving from the client device a connection setting request indicating a connection between a connection source object selected as a connection setting target on the client device and a connection destination object selected as a file or a folder included in the archive file from among the candidates on the client device corresponding to the plurality of files in the archive file, a record defining the connection between the connection source object and the connection destination object indicated by the connection setting request; and registering the record in a connection table stored in the storage unit, the record registered in the connection table allowing the computer to identify the connection between the connection source object and the connection destination object in units of the files or folders included in the archive file.

2. The non-transitory computer-readable recording medium according to claim 1, wherein the acquiring includes acquiring the identification information of the plurality of files by decompressing the single archive file.

3. The non-transitory computer-readable recording medium according to claim 1, wherein the acquiring includes acquiring identification information of a data object included in at least one file among the plurality of files, in addition to the identification information of the plurality of files included in the single archive file, when the at least one file among the plurality of files includes the data object, and when the folder stores the single archive file, the single archive file being generated by integrating the plurality of files and performing a compression process on the integrated plurality of files, or the single archive file being generated by integrating the plurality of files, and the outputting includes outputting to the client device the acquired identification information of the plurality of files and the acquired identification information of the data object as candidates for each of which it is possible to be associated with the another folder, or with the another file, or with the individual data object included in another file.

4. The non-transitory computer-readable recording medium according to claim 1, wherein:

the acquiring includes acquiring hierarchal structure information indicating a hierarchal structure of the plurality of files; and the implementing includes implementing control to store, in the storage unit, the acquired identification information of the plurality of files and the acquired hierarchal structure information.

5. A file management method executed by a computer which stores a file in a folder, the file management method comprising:

acquiring identification information of a plurality of files included in a single archive file, the archive file being stored in the folder, and the plurality of files being integrated into the archive file or integrated and compressed into the archive file;
outputting to a client device the acquired identification information of the plurality of files as candidates for each of which it is possible to be associated with another folder, or with another file, or with an individual data object included in another file; and
when another archive file including still another file having identification information identical to identification information of one of the plurality of files which is specified to be associated with the another folder, or with the another file, or with the individual data object included in another file is found in the folder,
implementing control to store, in a storage unit, association information to associate the still another file, instead of the one of the plurality of files, with the another folder, or with the another file, or with the individual data object included in another file,
wherein the implementing includes:
generating, in response to receiving from the client device a connection setting request indicating a connection between a connection source object selected as a connection setting target on the client device and a connection destination object selected as a file or a folder included in the archive file from among the candidates on the client device corresponding to the plurality of files in the archive file, a record defining the connection between the connection source object and the connection destination object indicated by the connection setting request; and
registering the record in a connection table stored in the storage unit, the record registered in the connection table allowing the computer to identify the connection between the connection source object and the connection destination object in units of the files or folders included in the archive file.

6. The file management method according to claim 5, wherein
the acquiring includes acquiring the identification information of the plurality of files by decompressing the single archive file.

7. The file management method according to claim 5, wherein
the acquiring includes acquiring identification information of a data object included in at least one file among the plurality of files, in addition to the identification information of the plurality of files included in the single archive file, when the at least one file among the plurality of files includes the data object, and when the folder stores the single archive file, the single archive file being generated by integrating the plurality of files and performing a compression process on the integrated plurality of files, or the single archive file being generated by integrating the plurality of files, and
the outputting includes outputting to the client device the acquired identification information of the plurality of files and the acquired identification information of the data object as candidates for each of which it is possible to be associated with the another folder, or with the another file, or with the individual data object included in another file.

8. The file management method according to claim 5, wherein:
the acquiring includes acquiring hierarchal structure information indicating a hierarchal structure of the plurality of files; and
the implementing includes implementing control to store, in the storage unit, the acquired identification information of the plurality of files and the acquired hierarchal structure information.

9. A file management device storing a file in a folder, the file management device comprising:
a processor configured to execute a process including
acquiring identification information of a plurality of files included in a single archive file, the archive file being stored in the folder, and the plurality of files being integrated into the archive file or integrated and compressed into the archive file,
outputting to a client device the acquired identification information of the plurality of files as candidates for each of which it is possible to be associated with another folder, or with another file, or with an individual data object included in another file, and
when another archive file including still another file having identification information identical to identification information of one of the plurality of files which is specified to be associated with the another folder, or with the another file, or with the individual data object included in another file is found in the folder,
implementing control to store, in a storage unit, association information to associate the still another file, instead of the one of the plurality of files, with the another folder, or with the another file, or with the individual data object included in another file,
wherein the implementing includes:
generating, in response to receiving from the client device a connection setting request indicating a connection between a connection source object selected as a connection setting target on the client device and a connection destination object selected as a file or a folder included in the archive file from among the candidates on the client device corresponding to the plurality of files in the archive file, a record defining the connection between the connection source object and the connection destination object indicated by the connection setting request; and
registering the record in a connection table stored in the storage unit, the record registered in the connection table allowing the computer to identify the connection between the connection source object and the connection destination object in units of the files or folders included in the archive file.

10. The file management device according to claim 9, wherein
the acquiring includes acquiring the identification information of the plurality of files by decompressing the single archive file.

11. The file management device according to claim 9, wherein the process further comprises:
acquiring identification information of a data object included in at least one file among the plurality of files, in addition to the identification information of the plurality of files included in the single archive file, when the at least one file among the plurality of files includes the data object, and when the folder stores the single archive file, the single archive file being generated by integrating the plurality of files and performing a compression process on the integrated plurality of files, or the single archive file being generated by integrating the plurality of files; and
outputting to the client device the acquired identification information of the plurality of files and the acquired identification information of the data object as candidates for each of which it is possible to be associated with the another folder, or with the another file, or with the individual data object included in another file.

12. The file management device according to claim 9, wherein:
the acquiring includes acquiring hierarchal structure information indicating a hierarchal structure of the plurality of files; and
the implementing includes implementing control to store, in the storage unit, the acquired identification information of the plurality of files and the acquired hierarchal structure information.

13. A file management system which stores a file in a folder, the file management system comprising:
a processor configured to execute a process including
acquiring identification information of a plurality of files included in a single archive file, the archive file being stored in the folder, and the plurality of files being integrated into the archive file or integrated and compressed into the archive file,
outputting to a client device the acquired identification information of the plurality of files as candidates for each of which it is possible to be associated with another folder, or with another file, or with an individual data object included in another file, and
when another archive file including still another file having identification information identical to identification information of one of the plurality of files which is specified to be associated with the another folder, or with the another file, or with the individual data object included in another file is found in the folder,
implementing control to store, in a storage unit, association information to associate the still another file, instead of the one of the plurality of files, with the another folder, or with the another file, or with the individual data object included in another file,
wherein the implementing includes:
generating, in response to receiving from the client device a connection setting request indicating a connection between a connection source object selected as a connection setting target on the client device and a connection destination object selected as a file or a folder included in the archive file from among the candidates on the client device corresponding to the plurality of files in the archive file, a record defining the connection between the connection source object and the connection destination object indicated by the connection setting request; and
registering the record in a connection table stored in the storage unit, the record registered in the connection table allowing the computer to identify the connection between the connection source object and the connection destination object in units of the files or folders included in the archive file.

14. The file management system according to claim 13, wherein
the acquiring includes acquiring the identification information of the plurality of files by decompressing the single archive file.

15. The file management system according to claim 13, wherein the process further comprises:
acquiring identification information of a data object included in at least one file among the plurality of files, in addition to the identification information of the plurality of files included in the single archive file, when the at least one file among the plurality of files includes the data object, and when the folder stores the single archive file, the single archive file being generated by integrating the plurality of files and performing a compression process on the integrated plurality of files, or the single archive file being generated by integrating the plurality of files; and
outputting to the client device the acquired identification information of the plurality of files and the acquired identification information of the data object as candidates for each of which it is possible to be associated with the another folder, or with the another file, or with the individual data object included in another file.

16. The file management system according to claim 13, wherein:
the acquiring includes acquiring hierarchal structure information indicating a hierarchal structure of the plurality of files; and
the implementing includes implementing control to store, in the storage unit, the acquired identification information of the plurality of files and the acquired hierarchal structure information.

* * * * *